(12) United States Patent
Ellis et al.

(10) Patent No.: US 9,296,869 B2
(45) Date of Patent: Mar. 29, 2016

(54) COMPOSITE MATERIALS

(75) Inventors: John Ellis, Duxford (GB); Emille Fisset, Enfield (GB); David Tilbrook, Saffron Walden (GB); Paul Mackenzie, Purley (GB)

(73) Assignee: Hexcel Composites Limited, Duxford (GB)

( * ) Notice: Subject to any disclaimer, the term of this patent is extended or adjusted under 35 U.S.C. 154(b) by 367 days.

(21) Appl. No.: 13/379,025

(22) PCT Filed: Jun. 25, 2010

(86) PCT No.: PCT/GB2010/051051
§ 371 (c)(1),
(2), (4) Date: Dec. 18, 2011

(87) PCT Pub. No.: WO2010/150021
PCT Pub. Date: Dec. 29, 2010

(65) Prior Publication Data
US 2012/0100335 A1    Apr. 26, 2012

(30) Foreign Application Priority Data
Jun. 26, 2009    (GB) .................................. 0911035.4

(51) Int. Cl.
*C08J 5/24* (2006.01)
*B29C 70/02* (2006.01)
*B29C 70/88* (2006.01)
*B32B 5/26* (2006.01)
*B32B 5/28* (2006.01)
*B29K 105/08* (2006.01)
*B29K 105/24* (2006.01)

(52) U.S. Cl.
CPC ................. *C08J 5/24* (2013.01); *B29C 70/025* (2013.01); *B29C 70/882* (2013.01); *B32B 5/26* (2013.01); *B32B 5/28* (2013.01); *B29K 2105/08* (2013.01); *B29K 2105/243* (2013.01); *B29K 2995/0005* (2013.01); *Y10T 428/24132* (2015.01); *Y10T 428/249921* (2015.04); *Y10T 428/249942* (2015.04); *Y10T 428/25* (2015.01); *Y10T 428/30* (2015.01)

(58) Field of Classification Search
None
See application file for complete search history.

(56) References Cited

U.S. PATENT DOCUMENTS

| | | | |
|---|---|---|---|
| 4,919,739 A | | 4/1990 | Dyksterhouse et al. |
| 5,962,348 A | | 10/1999 | Bootle et al. |
| 6,410,126 B1 | | 6/2002 | Guevel et al. |
| 2003/0062118 A1 | | 4/2003 | Gerhard et al. |
| 2008/0286578 A1 | * | 11/2008 | Tilbrook et al. ............... 428/413 |
| 2011/0059308 A1 | * | 3/2011 | Partington et al. .......... 428/297.4 |
| 2013/0330514 A1 | * | 12/2013 | Cawse et al. ................. 428/143 |

FOREIGN PATENT DOCUMENTS

| | | |
|---|---|---|
| EP | 0274899 A2 | 7/1988 |
| EP | 2053078 | 4/2009 |

(Continued)

*Primary Examiner* — Jacob T Minskey
*Assistant Examiner* — Camie Thompson
(74) *Attorney, Agent, or Firm* — W. Mark Bielawski; David J. Oldenkamp

(57) ABSTRACT

A prepreg comprising a structural layer of packed unidirectional conductive fibres comprising thermosetting resin in the interstices, and a first outer layer of resin comprising thermosetting resin, and being essentially free of unidirectional conductive fibres, which when cured under elevated temperature, produces a cured composite material comprising a cured structural layer of packed unidirectional conductive fibres and a first outer layer of cured resin comprising unidirectional conductive fibres dispersed within.

15 Claims, 6 Drawing Sheets

(56) References Cited

FOREIGN PATENT DOCUMENTS

| | | |
|---|---|---|
| WO | 93/18910 | 9/1993 |
| WO | 2008/040963 | 4/2008 |
| WO | 2008/056123 | 5/2008 |
| WO | 2010/035021 | 4/2010 |

\* cited by examiner

COMPOSITE MATERIALS

TECHNICAL FIELD

The present invention relates to prepregs comprising fibres and resin matrix which when stacked to form a laminate and subsequently cured, form composite materials, particularly with improved resistance to damage caused by lightning strikes.

BACKGROUND

Composite materials have well-documented advantages over traditional construction materials, particularly in providing excellent mechanical properties at very low material densities. As a result, the use of such materials is becoming increasingly widespread and their fields of application range from "industrial" and "sports and leisure" to high performance aerospace components.

Prepregs, comprising a fibre arrangement impregnated with resin such as epoxy resin, are widely used in the generation of such composite materials. Typically a number of plies of such prepregs are "laid-up" as desired and the resulting laminate is cured, typically by exposure to elevated temperatures, to produce a cured composite laminate.

A common composite material is made up from a laminate of a plurality of prepreg fibre layers, e.g. carbon fibres, interleafed with resin layers. Although the carbon fibres have some electrical conductivity, the presence of the interleaf layers means that this is only predominantly exhibited in the composite in the plane of the laminate. The electrical conductivity in the direction orthogonal to the surface of the laminate, the so-called z-direction, is low.

Practitioners in the art have a strong preference for such interleaf laminates having well defined layers of fibre separated by well defined layers of resin to produce a uniform layered laminate. It is believed that such clearly defined layers provide improved mechanical properties, especially impact resistance.

The lack of conductivity in the z-direction is generally accepted to contribute to the vulnerability of composite laminates to electromagnetic hazards such as lightning strikes. A lightning strike can cause damage to the composite material which can be quite extensive, and could be catastrophic if occurring on an aircraft structure in flight. This is therefore a particular problem for aerospace structures made from such composite materials.

A wide range of techniques and methods have been suggested in the prior art to provide lightning strike protection to such composite materials, typically involving the addition of conductive elements at the expense of increasing the weight of the composite material.

In WO 2008/056123 improvements have been made in lightning strike resistance, by adding hollow conductive particles in the resin interleaf layers so that they contact the adjacent fibre layers and create an electrical pathway in the z-direction. However this often requires elaborate processing methods and can reduce fatigue properties.

There therefore remains a need in the art for a conductive composite material which is lightweight and has excellent mechanical properties.

SUMMARY OF INVENTION

In a first aspect, the invention relates to a prepreg comprising a structural layer of packed unidirectional conductive fibres comprising thermosetting resin in the interstices, and a first outer layer of resin comprising thermosetting resin being essentially free of unidirectional conductive fibres, which when cured under elevated temperature, produces a cured composite material comprising a cured structural layer of packed unidirectional conductive fibres and a first outer layer of cured resin comprising unidirectional conductive fibres dispersed within.

In another aspect, the invention relates to a prepreg comprising a structural layer of packed unidirectional conductive fibres comprising thermosetting resin in the interstices, and a first outer layer of resin comprising thermosetting resin which when cured under elevated temperature, produces a cured composite material comprising a cured structural layer of packed unidirectional conductive fibres and a first outer layer of cured resin comprising unidirectional conductive fibres dispersed within.

The presence of conductive fibres in the first outer layer has the effect that, when a plurality of such prepregs are stacked together, producing a prepreg stack comprising a plurality of layers of conductive fibres separated by resin interleaf layers, and then cured to form a cured composite laminate, much greater conductivity in the z-direction is obtained. It is believed that this is because of a bridging effect, with the fibres dispersed in the interleaf layer providing electrical contacts between the fibre layers.

Additionally, the resin interleaf formed from the first outer layer provides the advantages in mechanical performance associated with an interleaf free of fibres, despite the presence of the dispersion of conductive unidirectional fibres.

Thus, in a second aspect, the invention relates to a cured composite laminate, comprising a plurality of layers of unidirectional conductive fibres separated by layers of cured resin comprising unidirectional conductive fibres dispersed therein.

It should be noted that in specifying any range or amount, any particular upper value can be associated with any particular lower value.

The term "essentially free of unidirectional conductive fibres" can be taken to mean that the resin layer comprises less than 1% by volume of unidirectional conductive fibres. However it is to be noted that other materials may be present in the resin layer, as desired.

Typically the orientation of the fibres will vary throughout the laminate, for example by arranging for the fibres in neighbouring unidirectional fibre layers to be orthogonal to each other in a so-called 0/90 arrangement signifying the angles between neighbouring fibre layers. Other arrangements such as 0/+45/−45/90 are of course possible among many other arrangements.

Additional components may be added to the laminate as desired and according to the intended applications.

Conveniently, the conductive unidirectional fibres in the first outer layer are from the population of the structural layer of packed unidirectional conductive fibres in the uncured prepreg.

It has been found that, contrary to the general understanding in the art that uniform layers of fibres should be separated by uniform layers of resin free of fibres, permitting, or even encouraging, migration of fibres into the interleaf layer, e.g. during cure, can provide a conductive composite material with the mechanical performance of a traditional uniform interleaf composite.

It is understood that the cured composite material having the resin layer comprising unidirectional fibres dispersed within can be generated by controlled disruption of the packed fibres of the prepreg during its manufacture. The controlled disruption leads to migration of select fibres into the first outer layer, rather than remaining as a distinct structural layer. This is believed to occur during the initial stages of a thermal cure process when the viscosity of the resin decreases dramatically before curing begins and material can migrate under the right conditions.

Thus, by effectively rearranging the location of the unidirectional conductive fibres, no additional materials need be included and considerable improvements in conductivity can be achieved without necessarily increasing the weight of the laminate.

It has also been found that, by preparing the uncured prepreg so that particulate material is included in the resin, it is driven into the structure of the packed unidirectional conductive fibres, causing such controlled disruption. Upon curing, as the temperature rises and the resin initially becomes less viscous, the particulate material becomes mobile and the particles previously driven into the packed fibres have a tendency to move out of the packed fibres, drawing some fibres into the first outer layer, or interleaf layer.

Thus preferably, the prepreg comprises particulate material located in the first outer layer and within a region of the structural layer adjacent the first outer layer. Typically from 2 to 70 wt % will be located in the structural layer, the remainder in the first outer layer, preferably from 5 to 40 wt %.

Likewise the cured composite laminate preferably comprises particulate material located in the interleaf layers. Typically at least 70% by weight of the particulate material is in the interleaf layers.

Thus the interleaf layers typically involve a continuous phase of resin with both particulate material and conductive fibres dispersed therein.

It has been found that particulate material which has a mean particle size close to that of the diameter of the unidirectional fibres are particularly effective at penetrating and driving into the packed unidirectional fibres. If the particulate material is too small then it will flow into the interstices without causing disruption to the fibres, and if it is too large will not be able to disrupt the fibres and merely filter and accumulate at the surface of the fibres. Thus, preferably the ratio of the mean particle size of the particulate material to the mean diameter of the packed unidirectional fibres in the prepreg is from 4:1 to 1:4, preferably from 3:1 to 1:3, preferably from 2:1 to 1:2, more preferably from 1.5:1 to 1:1.5.

It has been found that spherical particles penetrate the packed fibres more effectively. Thus the particulate material preferably has a sphericity of greater than 0.6, preferably greater than 0.7, more preferably greater than 0.8.

The particulate material is typically present at a level of from 3 to 40% by weight, based on the total resin content, preferably from 10 to 30% by weight.

The particulate material can be made from a wide variety of materials, however preferably they provide an additional useful function such as improved toughness or conductivity. Materials which are suitable include polyamide 6, polyamide 6/12, polyamide 12, conductive coatings on particulates formed from resins such as phenolic resins or from glass beads, coatings such as silver, carbon particles and/or microparticles and others.

In a preferred embodiment, the prepreg comprises a second outer layer forming the face of the prepreg not formed by the first outer layer. The second outer layer will usually be the same composition as the first outer layer and will also preferably be of the same thickness as the first outer layer. In this embodiment a first and a second outer layer combine to become interleaf layer when a plurality of such prepregs are stacked together.

The cured composite laminates produced according to the invention have remarkably low electrical resistance with a 3 mm thick laminate having an electrical resistance of less than 5Ω, preferably less than 2Ω, less than 1Ω, or even less than 0.5Ω being possible, as measured in the z-direction according to the test method described below. Similar composites with no conductive fibres in the interleaf layers can have much greater electrical resistance, for example well-ordered laminates having well-defined layers of fibre and resin.

Once formed, the interleaf layers of the cured composite laminate are typically much thinner than the structural fibre layers. Thus, the ratio of the total thickness of the structural layers to the total thickness of the interleaf layers in the cured composite laminate is from 10:1 to 3:1.

Although a number of structural fibres migrate from the packed fibres into the interleaf layer during cure, this does not have a significant effect on the thickness of the structural layer, due to the generally small number of fibres which migrate. Therefore, the ratio of the thickness of the packed fibres in the prepreg to the thickness of the first, and if present the second, outer layer, is also from 10:1 to 3:1.

In view of the migration of fibres during curing, the physical boundary between the packed fibres and the first outer layer in the prepreg will be more clearly defined than the physical boundary between the conductive fibre layers and the interleaf layers in the cured laminate.

Thus, in view of the above, it may be assumed that the layers in the cured laminate are defined by the layers in the uncured prepregs. For example, if the prepregs comprise a 220 μm thick fibre layer with a first and second outer layer of 20 μm each, the interleaf layers in the resulting laminate are defined herein to be 40 μm thick. A small amount of dimensional expansion or contraction of the thickness can occur during cure, so this must be taken into account in a proportional manner in the above assumption.

It has been found that only a small quantity of conductive unidirectional fibres need to migrate into the interleaf layer in order to provide significant increases in conductivity. Additionally too many fibres in the interleaf layer will cause the layer to lose its interleaf character and can result in a reduction of mechanical strength. Thus, preferably the interleaf layers comprise from 1 to 50% by volume of the conductive unidirectional fibres, preferably from 1 to 40%, more preferably from 5 to 30%, most preferably from 10 to 20%.

The resin of the structural layers or the interleaf layers comprise a thermosetting resin and may be selected from those conventionally known in the art, such as resins of phenol formaldehyde, urea-formaldehyde, 1,3,5-triazine-2,4,6-triamine (Melamine), Bismalemide, epoxy resins, vinyl ester resins, Benzoxazine resins, polyesters, unsaturated polyesters, Cyanate ester resins, or mixtures thereof. Epoxy resins are particularly preferred. Curing agents and optionally accelerators may be included as desired.

In a preferred embodiment the resin in the structural layers is the same composition as that in the interleaf layers.

The conductive fibres may be any fibre suitable for use in a composite material which is electrically conductive. A preferred fibre is carbon fibre.

Typically the fibres in the structural layer will have a circular or almost circular cross-section with a diameter in the range of from 3 to 20 μm, preferably from 5 to 12 μm. As it is preferable that the fibres in the interleaf layer are from the same population as those in the structural layer, they too typically have a diameter in the range of from 3 to 20 μm, preferably from 3 to 12 μm.

As discussed above, the disrupted nature of the prepreg is believed to be of key importance in the subsequent migration of conductive fibres into the first outer layer or interleaf layer.

It has been found that an effective way of achieving the disruption is by employing a prepreg manufacturing method where the resin which is to enter the interstices of the packed fibres is the same resin which forms the first outer layer.

Thus, in another aspect, the invention relates to a process for the manufacture of a prepreg as herein defined comprising continuously feeding a layer of unidirectional conductive fibres, bringing into contact with a first face of the fibres a first layer of resin comprising thermosetting resin, and compressing the resin and fibres together sufficient for the resin to enter the interstices of the fibres and the resin being in sufficient amount for the resin to leave a first outer layer of resin essentially free of unidirectional conductive fibres.

Preferably a second layer of resin comprising thermosetting resin is brought into contact with a second face of the fibres, typically at the same time as the first layer, compressing the first and second layers of resin together with the fibres such that resin enters the interstices of the fibres. Such a process is considered to be a one-stage process because although each face of the fibres is contacted with one resin layer, all the resin in the eventual prepreg is impregnated in one stage.

It is highly desirable that the particulate material be dispersed within the first, and if present second, resin layer. Upon compression the resin is forced into the interstices and partial filtration of the particulate material occurs such that the particulate material is driven into the structure of the fibres, disrupting its structure with some particles embedding themselves in the outer region of the fibres.

Known interleaf prepregs are typically produced in a two stage process. The first stage bringing the fibres into contact with resin which enters the interstices, followed by bringing into contact with another resin which comprises particulate material, typically toughener particles. This second step is intended merely to lay down the resin including particulate material to produce a uniform layered prepreg. This two stage process is considered in the prior art to be desirable because it can produce well-ordered laminates with well defined layers of fibre and resin.

It has been found that superior results are obtainable if impregnation of resin is carried out by passing the resin and fibres over one or more impregnation rollers wherein the pressure exerted onto the conductive fibres and resin does not exceed 40 kg per centimetre of the width of the conductive fibre layer.

It is believed that high impregnation pressures conventional in the art, when applied to a one-stage process, induce too high a degree of disruption. Thus, the desired controlled disruption can arise by the combination of a one-stage impregnation process and the low pressures involved.

Resin impregnation typically involves passing the resin and fibres over rollers, which may be arranged in a variety of ways. Two primary arrangements are the simple "nip" and the "S-wrap" arrangements.

An S-wrap stage is wherein the resin and fibres, both in sheet form pass around two separated rotating rollers in the shape of the letter "S", known as S-wrap rollers. Alternative roller arrangements include the widely used "nip" wherein the fibre and resin are pinched, or nipped, together as they pass between the pinch point between two adjacent rotating rollers.

It is understood that S-wrap provides ideal conditions for reliable and reproducible impregnation of the resin between the interstices of the fibres whilst also providing sufficient disruption.

However, nip stages are also possible, provided the pressures are kept low, e.g. by control over the gap between adjacent rollers.

It has been found that although large pressures in theory provide excellent resin impregnation, they can be detrimental to the outcome of the prepreg in the one-stage process according to the invention. It has been found that resin impregnation can be unreliable and fall outside required tolerances.

Thus, the pressure exerted onto the conductive fibres and resin preferably does not exceed 40 kg per centimetre of width of the conductive fibre layer, more preferably does not exceed 35 kg per centimetre, more preferably does not exceed 30 kg per centimetre.

Following impregnation of resin into the fibres, often there is a cooling stage and further treatment stages such as laminating, slitting and separating.

To facilitate impregnation of the resin into the fibres it is conventional for this to be carried out at an elevated temperature, e.g. from 60 to 150° C. preferably from 100 to 130° C., so that the resin viscosity reduces. This is most conveniently achieved by heating the resin and fibres, before impregnation, to the desired temperature, e.g. by passing them through an infra-red heater. As mentioned above, following impregnation there is typically a cooling step, to reduce the tackiness of the formed prepreg. This cooling step can be used to identify the end of the impregnation stage.

S-wrap rollers from 200 to 400 mm in diameter, more preferably from 220 to 350 mm, most preferably from 240 to 300 mm, have been found to provide the right conditions for achieving the desired disrupted fibre structures.

Two rollers forming S-wrap rollers are also preferably spaced apart to provide a gap between the centres of them of from 250 to 500 mm, preferably from 280 to 360 mm, most preferably from 300 to 340 mm, e.g. 320 mm.

Two adjacent pairs of S-wrap rollers are preferably separated between the centres of respective rollers of from 200 to 1200 mm, preferably from 300 to 900 mm, most preferably from 700 to 900 mm, e.g. 800 mm.

The impregnation rollers may rotate in a variety of ways. They may be freely rotating or driven.

The impregnation rollers may be made from a wide variety of materials, although they typically have a metal exterior. Chrome finished rollers have been found to be preferable.

In order to improve handling of the resin it is conventional that it is supported onto a backing material, such as paper. The resin is then fed, typically from a roll, such that it comes into contact with the fibres, the backing material remaining in place on the exterior of the resin and fibre contact region. During the subsequent impregnation process the backing material provides a useful exterior material to apply pressure to, in order to achieve even impregnation of resin.

It has been found that when the backing material is compressible the forces produced by the impregnation process on the fibre layer are reduced. This is believed to be because compressible paper will become initially compressed during impregnation and only then will the forces from the impregnation process be transferred to the fibres. Thus, non-compressible paper is preferred because it increases the forces acting on the resin and fibres during impregnation, thus creating greater disruption of the fibres and better impregnation of the resin. A suitable measure of compressibility is the ratio of the thickness of the paper to its material density, called the compressibility ratio. It has been found that backing paper with a compressibility ratio of less than 0.001 kg$^{-1}$ m$^{-2}$ are preferred.

For example, a glassine-based calendared or super-calendared differential silicone coated release paper that has a compressibility factor 0.00083 works well compared to another paper that is not calendared or super-calendared with a compressibility factor of 0.00127. Glassine based super-calendared papers are commercially available from many sources such as Mondi and Laufenberg.

The invention will now be illustrated, by way of example, and with reference to the following figures in which.

EXAMPLES

Figure 1:
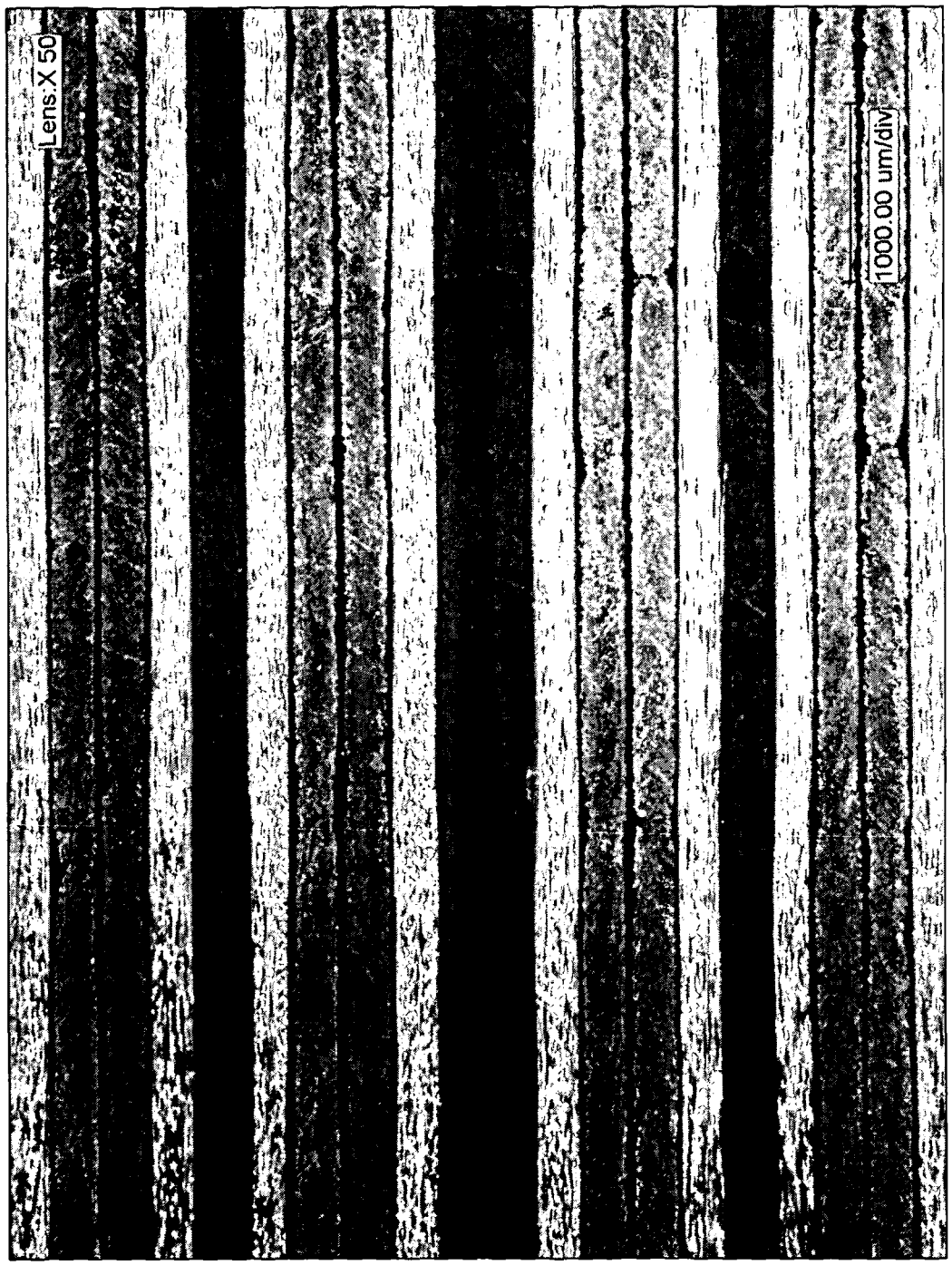
FIG. 1 is an image of a section through a prior art interleaf cured laminate.

Prepreg of this invention was manufactured following standard operating processes for resin mixing, filming and prepreg. Resin was mixed in a hot-melt process where liquid and powder components were first blended and then mixed again with further powder components that were the curing agent and toughening polyamide 6 particles at nominally 8 microns in diameter. Two batches of particles were employed, the first being Micropan 777 PA6, from Alchimica having a high sphericity and the second being Orgosol 1002, from Arkema and having a low sphericity. For the comparative example, 20 micron particle versions of those from Arkema which had a high sphericity, were used.

The curing agent and toughening particles were mixed into the first stage blend with high shear and suitable temperature (80° C.) to allow a "flowable viscosity" for decanting the resin from the mixing vessel without overheating and risking either excessive resin advancement or exothermic reaction. This mixing step can be completed in a batch type process or in a continuous mixing process using for example a twin screw extruder for continuous mixing and feed of hot resin direct to the coating machine.

In this example when the batch mixing process was complete the fully mixed resin formulation was decanted from the mixing vessel into the coating bath on the reverse roll filming machine. The filming process was typical for hot-melt reverse roll resin coating practices. The meter roll and applicator rolls were heated to the process temperature (85° C.) and a coating gap was set between them. The line speed, coating gap and applicator roll speed were controlled to allow a coating of resin at 69 gm-2 nominal to be coated to a super calendared glassine based double sided release paper as those typically used in the industry from suppliers such as Laufenberg or Mondi. Rolls of film were made at this coat weight and then taken to the prepreg line for use.

The prepreg line was set to make a prepreg where the resin type is as used in batches 1349 and 1351 of WO 2008/040963. The nominal amount of resin in the prepreg is 34% by weight, and this is achieved by using two layers of the coated film with each layer at nominally 69 gm-2 so 138 gm-2 in total. The fibre areal weight grade of the prepreg is 268 gm-2 of fibre in the prepreg product. The fibre grade type is IMA (from Hexcel), with sizing type as on the IMA fibre with 12,000 nominal number of carbon filaments at ~6 microns diameter in one IMA carbon fibre tow.

The carbon fibre type IMA has a mass per unit length of nominally 0.445 gm-1. Using calculations well known in the industry 370 spools of IMA 12k carbon fibre tow were loaded to a carbon fibre creel unit and each tow threaded into the prepreg line. This formed a carbon fibre web of ~615 mm wide and of nominally 268 gm-2. Two coated resin films were loaded to the prepreg machine such that one resin layer would be applied to the top surface of the carbon fibre web and one resin film would apply a resin layer to the bottom surface of the carbon fibre web. This is a typical one stage approach to prepreg processing.

The resin/fibre/resin layer, the "prepreg web" was routed through the prepreg line in s-wrap. The impregnation zone was heated to a temperature suitable for this resin system (120° C.) and line speed was controlled such that resin flow would be achieved during the time the prepreg web was retained within this hot impregnation zone.

The prepreg process was also such that carbon fibre tow tensions (incoming tension at comb area between 120 and 160 g/tow), temperature (120° C.), pressure from S-wrap and speed (5 m/minute) were controlled to provide a prepreg with fibre wet-out (impregnation) at desired levels for porosity free thick laminate structures. The prepreg was wound onto a core with one film coating release paper retained and one coating release paper replaced by a plain polythene protective layer.

The prepreg was then used to make a 12 ply 0° 90° laminate of 300 mm×300 mm that was cured in the typical cure cycle for such a prepreg. This is 2° C./minute heat up rate to 180° C. for a 2 hour cure then cooling to ambient all under ~6 bar pressure.

This laminate was then cut to provide 8 squares at ~38 mm×38 mm. The edges of these squares of cured laminate were then smoothed on the linishing machine to give good clean and even edges and a final diameter of ~36 mm×36 mm. The square laminate samples were then measured for resistance as described below. The measurement involves a cured composite of 3 mm thick and 36 mm×36 mm with a conductive layer (gold sputter) applied to both laminate faces. Resistance is then measured in Ohms.

Laminates were also tested for their compression after impact (CAI) properties, according to the procedure described below. The results of the resistance and CAI tests are shown below in Table 1. Comparative Example A falls outside the scope of the invention.

Resistance of Composite Laminates Test Method

A panel is prepared by autoclave cure that is 300 mm×300 mm×3 mm in size. The layup of the panel is 0/90. Specimens (typically three to four) for test are then cut from the panel that are 36 mm×36 mm. The square faces of the specimens should be sanded (for example on a on a Linisher machine) to expose the carbon fibres. This is not necessary if peel ply is used during the cure. Excess sanding should be avoided as this will penetrate past the first ply. The square faces are then coated with an electrically conductive metal, typically a thin layer of gold via a sputterer. Any gold or metal on the sides of the specimens should be removed by sanding prior to testing. The metal coating is required to ensure low contact resistance.

A power source (TTi EL302P programmable 30V/2A power supply unit, Thurlby Thandar Instruments, Cambridge, UK) that is capable of varying both voltage and current is used to determine the resistance. The specimen is contacted with the electrodes (tinned copper braids) of the power source and held in place using a clamp (ensure electrodes do not touch each other or contact other metallic surfaces as this will give a false result). Ensure the clamp has a non-conductive coating or layer to prevent an electrical path from one braid to the other. A current of one ampere is applied and the voltage noted. Using Ohm's Law resistance can then be calculated (V/I). The test is carried out on each of the cut specimens to give range of values. To ensure confidence in the test each specimen is tested two times.

Compression after Impact (CAI) Test Method

Compression after impact (CAI) testing at room temperature was conducted according to test protocols well known to those versed in the Art of aerospace composite testing. The specific test method followed for this work was AITM 1-0010.

Compression measurements were made using a test machine calibrated to Class1 of ISO 7500-1 and accurate to within 1% in the relevant load range. The tests were made at 23° C.+−2° C.

Quasi isotropic laminates approximately 4 mm thick were prepared according to EN 2565 method B. The panels were checked by non-destructive testing (C-scan) to ensure that they were free from detectable defects prior to impacting.

Samples were impacted with a hemispherical impact made of Material: steel Rm=2000 MPa according to EN 2760 or a steel of equivalent hardness. The indentor tip had a diameter: of 16±0.5 mm and a hemispherical radius: of 8±0.25 mm with a roughness: Ra<0.8 mm.

Indent depths on impacted specimens were measured using a depth gauge with hemispherical adapter, diameter 3 mm and calibrated to within 0.01 mm. Depth measurements were made within 30 minutes of impacting.

Samples were impacted across a variety of energies selected so that the effect of impact energy on indent depth, delamination and residual compression strength could be determined for across samples exhibiting indent depths from at least 1 mm to significantly lower indent depths.

Delamination areas were measured using a C-scan in the usual way. After impacting and measurement the residual compression strength was determined by loading the samples to failure using a compression tool equipped with antibuckling side guides designed to minimise load transfer to the guides.

Strain gauges and suitable automatic strain recording equipment shall be employed for calibration of the compression loading tool. BVID 1 mm CAI's were determined as triplicate measurements on samples impacted at an energy determined empirically to result in an indent 1 mm deep.

form layers of resin. FIG. 2 shows a close-up of the image of FIG. 1 clearly showing an interleaf layer comprising resin and toughener particles but free of fibres.

Figure 3:
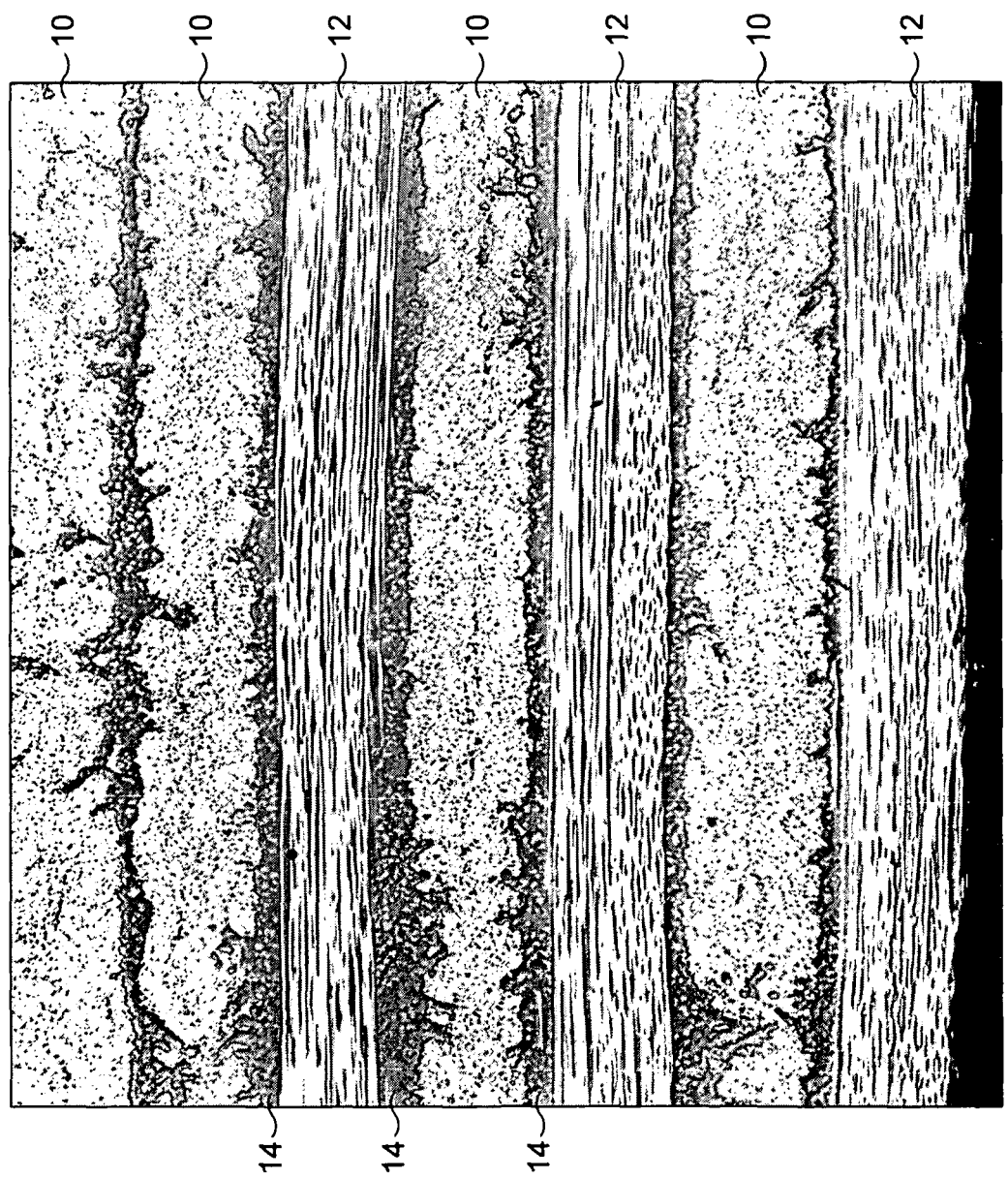
FIG. 3 is an image of a section through a cured laminate according to the present invention.
Figure 4:
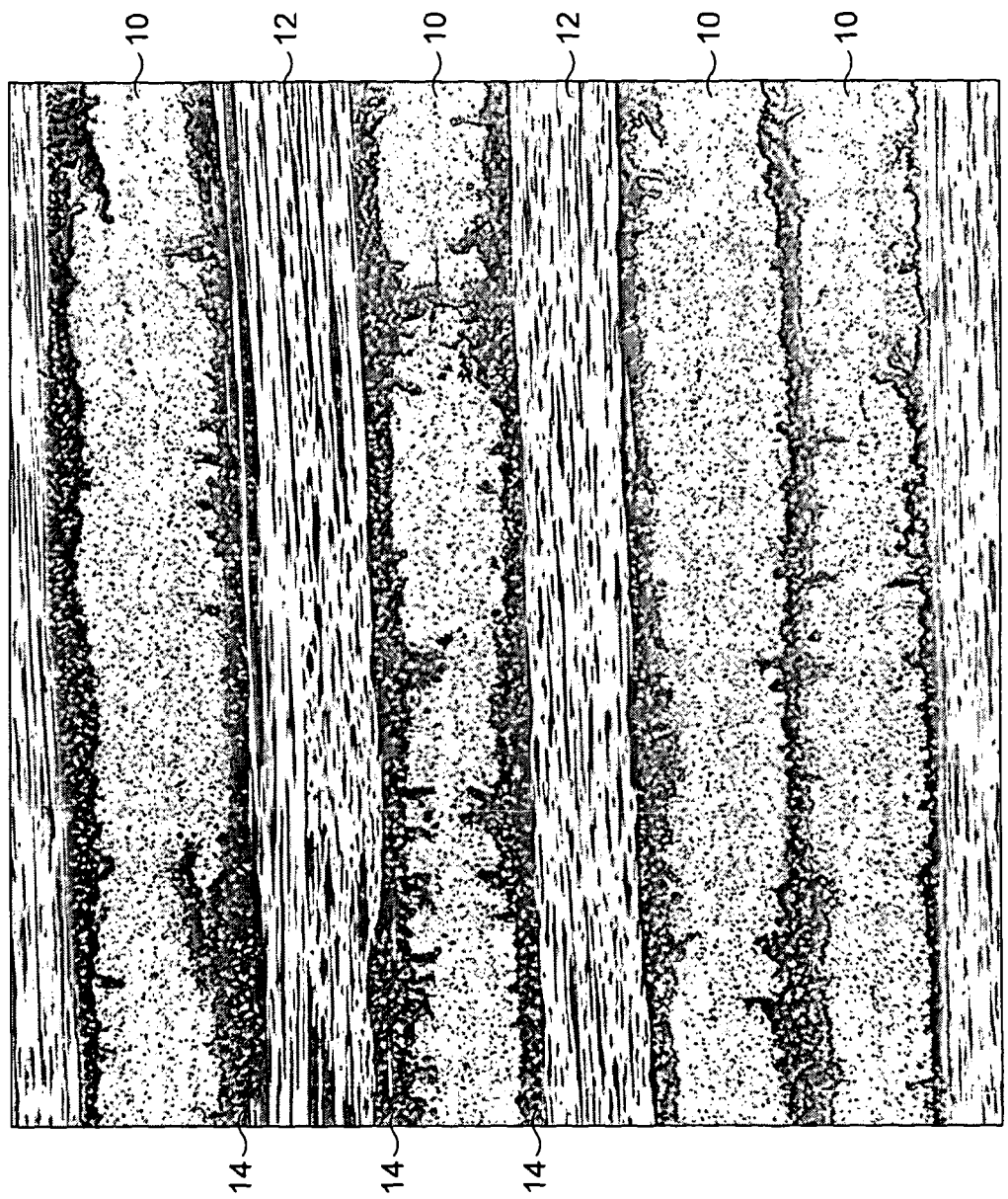
FIG. 4 is an image of a section through another cured laminate according to the invention.

FIG. 3 shows an image of a cross-section through a composite laminate according to the invention. It can be clearly seen that the laminate comprises layers of unidirectional fibres 10 passing into the page and unidirectional fibres 12 passing across the page. Separating the fibre layers 10, 12 are interleaf layers 14 which comprise a continuous phase of resin dispersed with toughener particles and unidirectional fibres. It can be seen that the fibre layers 10, 12 have been disrupted in order that some migrate into the interleaf layer during cure. FIG. 4 shows an image of another composite laminate according to the invention.

Figure 5:
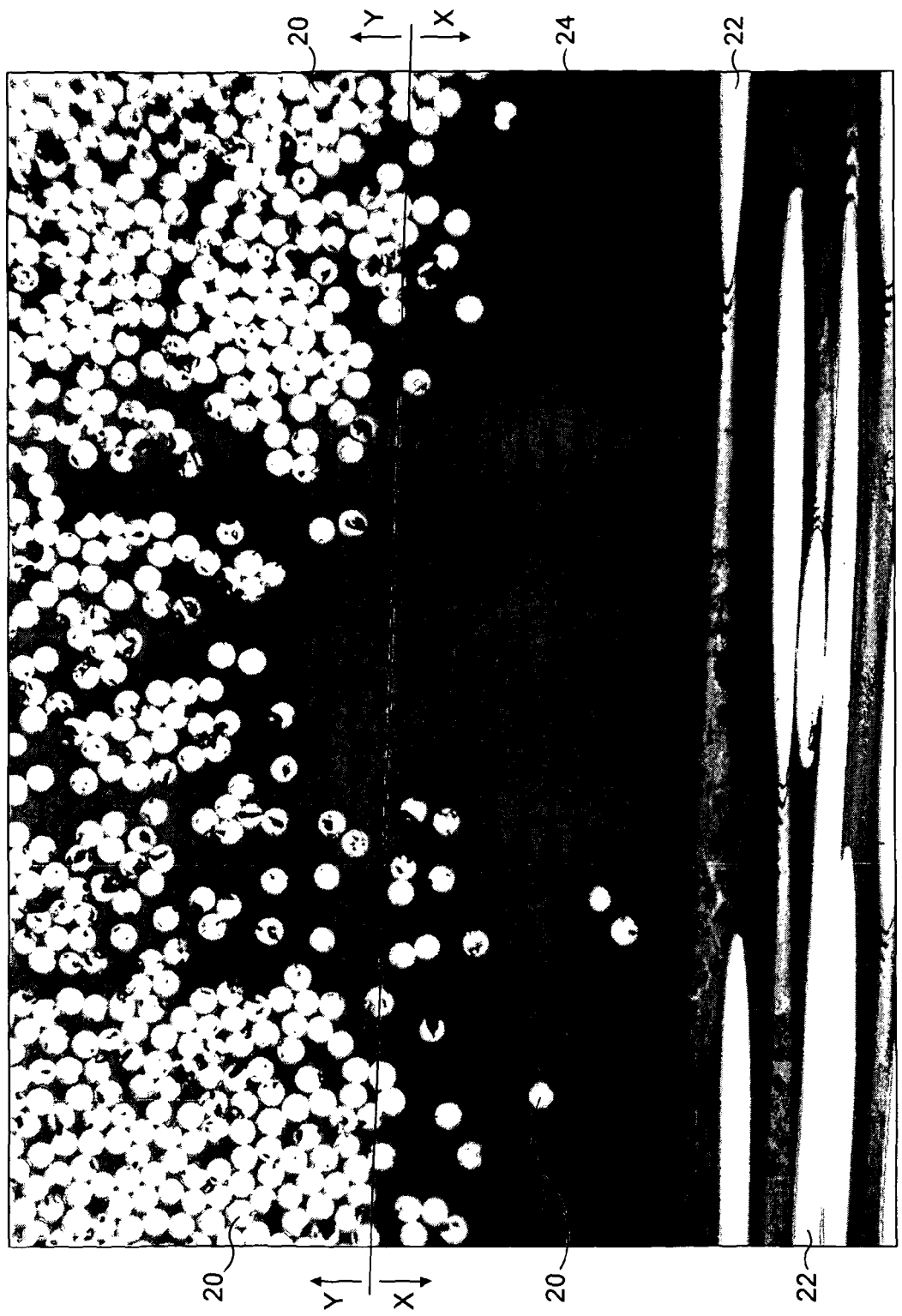
FIG. 5 is a close-up view of the image of FIG. 3.

FIG. 5 shows a close-up image of an interleaf layer of a cured laminate according to Example 4 according to the invention. Unidirectional fibres 20 passing into the page can be seen together with unidirectional fibres 22 across the page. The region below the line in the direction of X is defined to be the interleaf layer by reference to the well-defined interface between the fibres and resin in the uncured prepreg. Toughener particles 24 can be seen dispersed within continuous resin together with some unidirectional fibres 20. Even with a small quantity of conductive fibres in the interleaf, surprisingly high conductivities are achieved.

Figure 6:
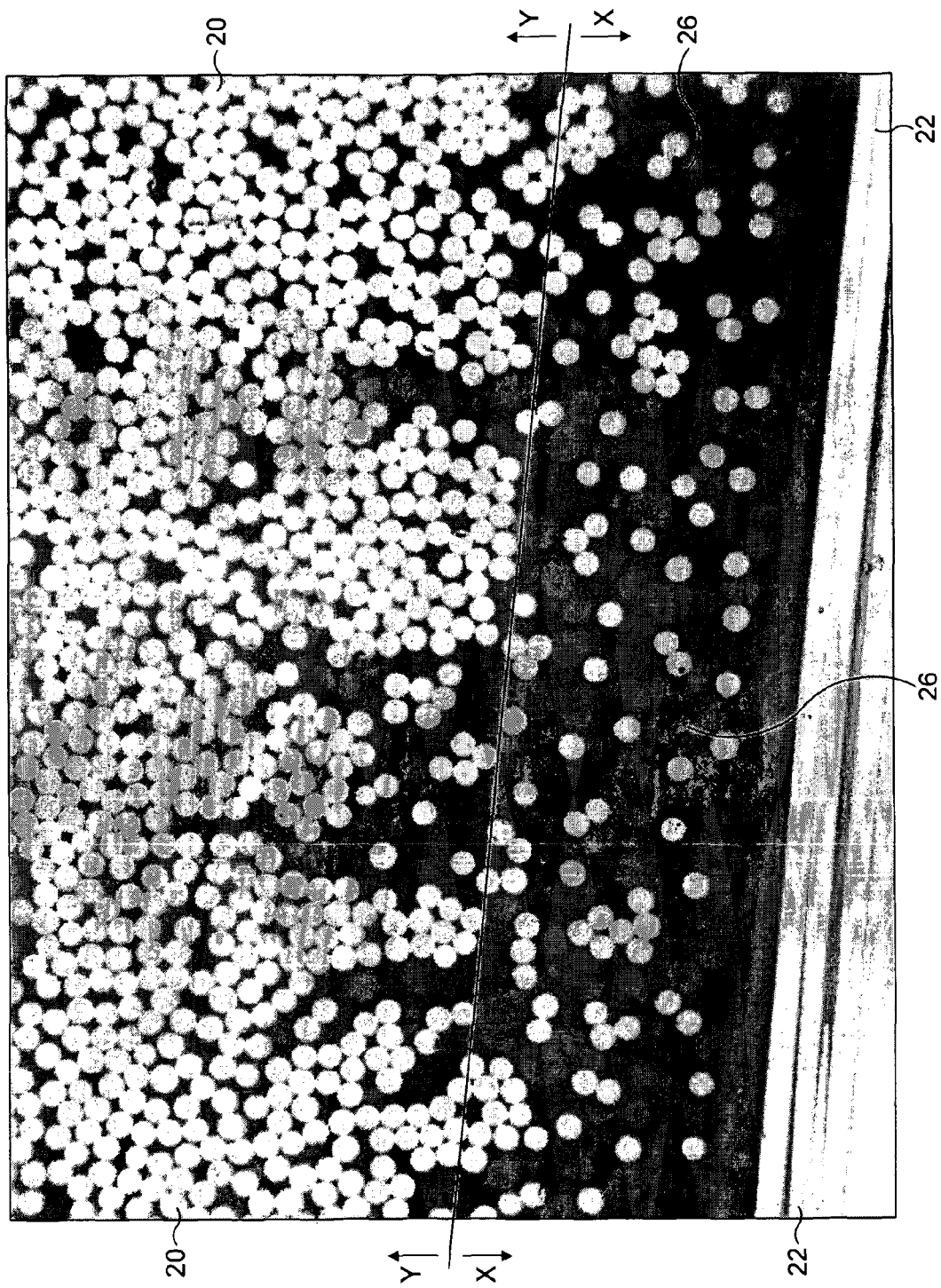
FIG. 6 is a close-up view of the image of FIG. 4.

FIG. 6 shows a close-up of an interleaf layer of another cured laminate according to Example 1 according to the invention. As for FIG. 5, a distinction between the fibre layer in direction Y above the line, and the interleaf layer in direction X below the line is made by reference to the location of the well-defined interface present in the corresponding uncured prepreg. In this case the toughener particles 26 can be seen to have the same particle size as the diameter of the unidirectional fibres 20. The interleaf layer comprises a dispersion of both toughener particles 26 and unidirectional fibres 20.

The invention claimed is:

1. A prepreg comprising a structural layer comprising a population of unidirectional conductive fibres having a cross-sectional diameter of from 3 to 12 microns and thermosetting resin, said prepreg further comprising a first outer layer of resin comprising thermosetting resin, said first outer layer of resin being located adjacent to a first surface of said structural layer and being essentially free of unidirectional conductive fibres, said structural layer comprising a first outer region located adjacent to said first outer layer of resin, said first

TABLE 1

| Example | Process | Particle Size (μm) | Sphericity | Resistance (Ω) | Indent depth 25J (mm) | Delam Area 25J (cm²) | CAI 25J (MPa) | CAI BVID 1 mm (MPa) |
|---------|---------|--------------------|------------|----------------|----------------------|---------------------|---------------|---------------------|
| A | Two stage | 20 | high | 7.0 | 0.21 | 8.1 | 289 | 214 |
| 1 | One | 8 | high | 0.5 | 0.23 | 6.7 | 279 | 208 |
| 2 | stage | 8 | high | 0.4 | — | — | — | — |
| 3 | S-wrap | 8 | high | 0.5 | 0.21 | 10.1 | 245 | 206 |
| 4 | One | 8 | low | 4.6 | — | — | — | — |
| 5 | stage | 8 | low | 3.4 | — | — | — | — |
| 6 | S-wrap | 8 | low | 4.3 | — | — | — | — |

It can be seen that disrupting the fibres in the prepreg, according to the present invention, gives dramatic increases in conductivity, without affecting the mechanical strength.

Figure 2:
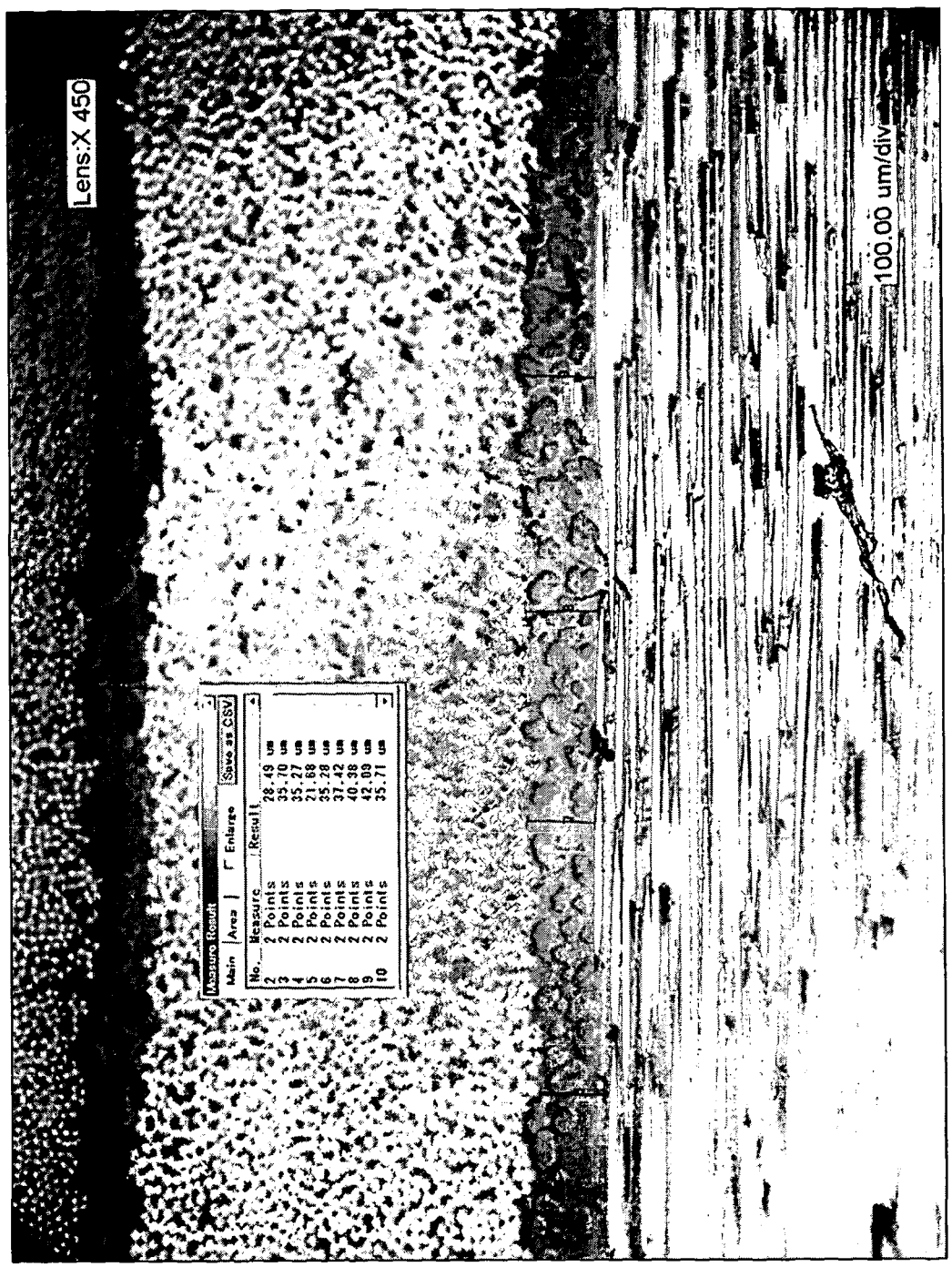
FIG. 2 is a close-up view of the image of FIG. 1.

Turning to the figures, FIG. 1 shows an image of a cross-section through a prior art interleaf composite laminate. It can be seen that uniform layers of fibre are interleafed with uniouter region comprising a first portion of said population of unidirectional conductive fibres wherein the unidirectional conductive fibres in said first portion have been disrupted so as to form disrupted interstices located therebetween, said disrupted interstices having a disrupted size, said structural layer comprising a first inner region located adjacent to said first outer region, said first inner region comprising a second portion of said population of unidirectional conductive fibres wherein the unidirectional conductive fibres in said second portion have not been disrupted, said population of unidirectional conductive fibres in said second portion having non-disrupted interstices located therebetween which have a non-disrupted size wherein the non-disrupted size of said non-disrupted interstices is smaller than the disrupted size of said disrupted interstices, said prepreg comprising a first particulate material wherein the ratio of the mean particle size of the first particulate material to the mean diameter of the unidirectional conductive fibres is from 1.5:1 to 1:1.5 and wherein the size of said first particulate material is sufficiently small so that said first particulate material is located in said disrupted interstices and wherein the size of said first particulate material is sufficiently large so that said first particulate material is not located in said non-disrupted interstices, and wherein the amount of first particulate material located in said disrupted interstices is from 5 to 40 weight percent of the total amount of first particulate material in said prepreg and wherein said prepreg, when cured, produces a cured composite material wherein said first portion of disrupted unidirectional fibres migrates into said first outer layer of resin.

2. A prepreg according to claim 1 wherein said first particulate material has a sphericity of greater than 0.8.

3. A prepreg according to claim 1, which comprises a second outer layer of resin which is located adjacent to a second surface of said structural layer that is opposite from said first outer layer of resin and wherein said second outer layer of resin is also essentially free of unidirectional conductive fibres and wherein said structural layer further comprises a second outer region located adjacent to said second outer layer of resin, said second outer region comprising a third portion of said population of unidirectional conductive fibres wherein the unidirectional conductive fibres in said third portion have been disrupted so as to form disrupted interstices located therebetween, said disrupted interstices having a disrupted size, said structural layer comprising a second inner region located adjacent to said second outer region, said second inner region comprising a fourth portion of said population of unidirectional conductive fibres wherein the unidirectional conductive fibres in said fourth portion have not been disrupted, said population of unidirectional conductive fibres in said fourth portion having non-disrupted interstices located therebetween which have a non-disrupted size wherein the non-disrupted size of said non-disrupted interstices in said fourth portion is smaller than the disrupted size of said disrupted interstices in said third portion, said prepreg comprising a second particulate material wherein the ratio of the mean particle size of the second particulate material to the mean diameter of the unidirectional conductive fibres is from 1.5:1 to 1:1.5 and wherein the size of said second particulate material is sufficiently small so that said second particulate material is located in said disrupted interstices of said third portion and wherein the size of said second particulate material is sufficiently large so that said second particulate material is not located in said non-disrupted interstices of said fourth portion, and wherein the amount of second particulate material located in said disrupted interstices of said third portion is from 5 to 40 weight percent of the total amount of second particulate material in said prepreg and wherein said prepreg, when cured, produces a cured composite material wherein said third portion of disrupted unidirectional fibres migrates into said second outer layer of resin.

4. A prepreg according to claim 3, wherein said second particulate material consists of polyamide particles.

5. A cured composite laminate comprising a prepreg according to claim 3 that has been cured such that from 10 to 20% of the population of said unidirectional conducting fibres has migrated into said second outer layer of resin.

6. A prepreg according to claim 3 wherein said population of unidirectional conductive fibres have cross-sectional diameters 6 microns.

7. A prepreg according to claim 6 wherein said first and second particulate materials consist of polyamide particles having a nominal diameter of 8 microns.

8. A prepreg according to claim 7 wherein said first and second particulate materials consist of polyamide particles that have a sphericity of greater than 0.8.

9. A prepreg according to claim 1, wherein the thermosetting resin in the structural layer is the same composition as the thermosetting resin in the first outer layer of resin.

10. A cured composite laminate comprising a prepreg according to claim 1 that has been cured such that from 10 to 20% of the population of said unidirectional conducting fibres has migrated into said first outer layer of resin.

11. A prepreg according to claim 1, wherein said first particulate material consists of polyamide particles.

12. A prepreg according to claim 1, wherein said unidirectional conductive fibers in said structural layer are carbon fibres.

13. A prepreg according to claim 1 wherein said population of unidirectional conductive fibres have cross-sectional diameters 6 microns.

14. A prepreg according to claim 13 wherein said first particulate material consists of polyamide particles having a nominal diameter of 8 microns.

15. A prepreg according to claim 14 wherein said first particulate material consists of polyamide particles that have a sphericity of greater than 0.8.

* * * * *